(12) United States Patent
Ligneul et al.

(10) Patent No.: US 11,066,925 B2
(45) Date of Patent: Jul. 20, 2021

(54) METHOD AND APPARATUS FOR DETERMINING FLUID FLOW CHARACTERISTICS

(71) Applicant: SCHLUMBERGER TECHNOLOGY CORPORATION, Sugar Land, TX (US)

(72) Inventors: Patrice Ligneul, Chaville (FR); Bertrand Theuveny, Moscow (RU); Tullio Moscato, Paris (FR); Sebastien Prangere, Toulouse (FR); Olivier Peyret, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 460 days.

(21) Appl. No.: 14/279,710

(22) Filed: May 16, 2014

(65) Prior Publication Data
US 2014/0338439 A1    Nov. 20, 2014

(30) Foreign Application Priority Data

May 17, 2013    (EP) .................................. 13305647

(51) Int. Cl.
*G01N 25/18*    (2006.01)
*E21B 47/103*    (2012.01)
(Continued)

(52) U.S. Cl.
CPC .......... *E21B 47/103* (2020.05); *E21B 43/117* (2013.01); *G01N 25/18* (2013.01); *G01P 5/10* (2013.01)

(58) Field of Classification Search
CPC .... E21B 49/08; E21B 47/065; E21B 27/1005; E21B 43/117; E21B 43/119
(Continued)

(56) References Cited

U.S. PATENT DOCUMENTS 3,668,927 A * 6/1972 Howell ................. E21B 47/065
                                                                374/44
3,864,969 A * 2/1975 Smith, Jr. ............. E21B 47/065
                                                                374/136
(Continued)

FOREIGN PATENT DOCUMENTS

CA        2785922 A1    7/2011
GB        2390623 A     1/2004
(Continued)

OTHER PUBLICATIONS

Schlumberger—Fundamentals of Formation testing—Simultaneous perforating and testing (2 pages).
(Continued)

*Primary Examiner* — Alexander A Mercado
(74) *Attorney, Agent, or Firm* — Cameron R. Sneddon

(57) ABSTRACT

A measurement device is configured in a shaped charge package to be utilized in a perforating gun section tool string. The measurement device may include for example thermal conductivity detectors (TCD) configured to measure fluid flow velocity and/or thermal characteristics of the flowing fluid. The measurement device may include for example a pair laterally spaced TCDs each having sensor faces positioned co-planar with a surface across which the fluid flows. The measurement device may include a recessed TCD, having a sensor face recessed below an opening in the exterior surface.

19 Claims, 6 Drawing Sheets

(51) Int. Cl.
*E21B 43/117* (2006.01)
*G01P 5/10* (2006.01)

(58) Field of Classification Search
USPC ........................................ 73/152.31
See application file for complete search history.

(56) References Cited

U.S. PATENT DOCUMENTS

| | | | | |
|---|---|---|---|---|
| 3,981,187 A | * | 9/1976 | Howell | G01K 3/10 374/136 |
| 4,265,117 A | * | 5/1981 | Thoma | G01K 7/00 136/221 |
| 4,575,260 A | * | 3/1986 | Young | G01N 27/185 374/136 |
| 4,741,198 A | * | 5/1988 | Farren | G01N 30/66 73/23.22 |
| 5,356,819 A | * | 10/1994 | Ritschel | G01N 25/18 422/82.01 |
| 6,618,677 B1 | | 9/2003 | Brown | |
| 6,766,854 B2 | | 7/2004 | Ciglenec et al. | |
| 7,318,343 B2 | * | 1/2008 | Coenen | E21B 49/005 73/152.01 |
| 7,350,971 B2 | * | 4/2008 | Egolf | G01N 25/18 374/102 |
| 7,748,266 B2 | * | 7/2010 | Evrard | E21B 49/005 73/152.19 |
| 8,371,746 B2 | * | 2/2013 | Scharer | G01N 25/486 374/10 |
| 8,584,519 B2 | * | 11/2013 | Maida | E21B 47/123 73/152.54 |
| 8,616,282 B2 | | 12/2013 | Moscato et al. | |
| 8,656,994 B2 | | 2/2014 | Shako et al. | |
| 8,859,090 B2 | | 10/2014 | Angelescu et al. | |
| 8,961,006 B2 | * | 2/2015 | Gleitman | E21B 47/06 374/120 |
| 2005/0247450 A1 | | 11/2005 | Ratanasirigulchai et al. | |
| 2007/0158064 A1 | | 7/2007 | Pribnow et al. | |
| 2007/0223558 A1 | * | 9/2007 | Lopez | G01N 25/18 374/44 |
| 2008/0065362 A1 | | 3/2008 | Lee et al. | |
| 2008/0137711 A1 | * | 6/2008 | Gleitman | E21B 47/06 374/161 |
| 2009/0260823 A1 | | 10/2009 | Prince-Wright et al. | |
| 2010/0000311 A1 | * | 1/2010 | Nakajima | G01V 1/186 73/152.47 |
| 2010/0046573 A1 | * | 2/2010 | Schick | G01K 17/04 374/11 |
| 2012/0152542 A1 | * | 6/2012 | Le | E21B 43/11 166/297 |
| 2012/0152614 A1 | * | 6/2012 | Rodgers | E21B 43/1195 175/2 |
| 2012/0318058 A1 | * | 12/2012 | Kimura | G01F 1/6842 73/204.23 |
| 2013/0214934 A1 | * | 8/2013 | Smart | E21B 47/1005 340/854.3 |
| 2014/0102695 A1 | | 4/2014 | Adil et al. | |
| 2014/0130591 A1 | | 5/2014 | Adil et al. | |
| 2014/0150546 A1 | | 6/2014 | Adil et al. | |
| 2014/0151032 A1 | | 6/2014 | Adil et al. | |
| 2014/0157884 A1 | | 6/2014 | Adil et al. | |
| 2014/0165715 A1 | | 6/2014 | Adil et al. | |
| 2014/0231074 A1 | | 8/2014 | Adil et al. | |
| 2014/0288836 A1 | | 9/2014 | Shako et al. | |
| 2015/0103869 A1 | | 4/2015 | Moscato et al. | |
| 2015/0135817 A1 | | 5/2015 | Moscato et al. | |
| 2015/0233239 A1 | | 8/2015 | Wang et al. | |

FOREIGN PATENT DOCUMENTS

| | | |
|---|---|---|
| GB | 2454423 A | 5/2009 |
| RU | 2143064 C1 | 12/1999 |
| RU | 2162514 C1 | 1/2001 |
| RU | 2315864 C2 | 1/2001 |
| RU | 2194855 C1 | 12/2002 |
| RU | 2290507 C2 | 12/2006 |
| SU | 326355 A1 | 1/1972 |
| SU | 905443 A1 | 2/1982 |
| SU | 1079827 A1 | 3/1984 |
| SU | 1328502 A1 | 8/1987 |
| WO | 9623957 A1 | 8/1996 |
| WO | WO2004003343 A1 | 1/2004 |

OTHER PUBLICATIONS

Perforating practice that optimize productivity, Schlumberger Oilfield Review, Spring 2000 (22 pages).
Search and Examination Report issued in the related GB Application 1408614.4 dated Oct. 22, 2014 (6 pages).
International Search Report and Written Opinion (english translation) issued in the related PCT application PCT/RU2012/000872, dated Mar. 14, 2013 (5 pages).
Extended Search Report issued in the related EP Application 12844033.6, dated Jan. 1, 2016 (4 pages).
Decision of Grant issued in the related RU application 2014119597 dated Sep. 3, 2018 (22 pages).
Office Action issued in the Br application 102014011707-5, dated Apr. 22, 2020 (8 pages).

* cited by examiner

FIG. 7
FIG. 8
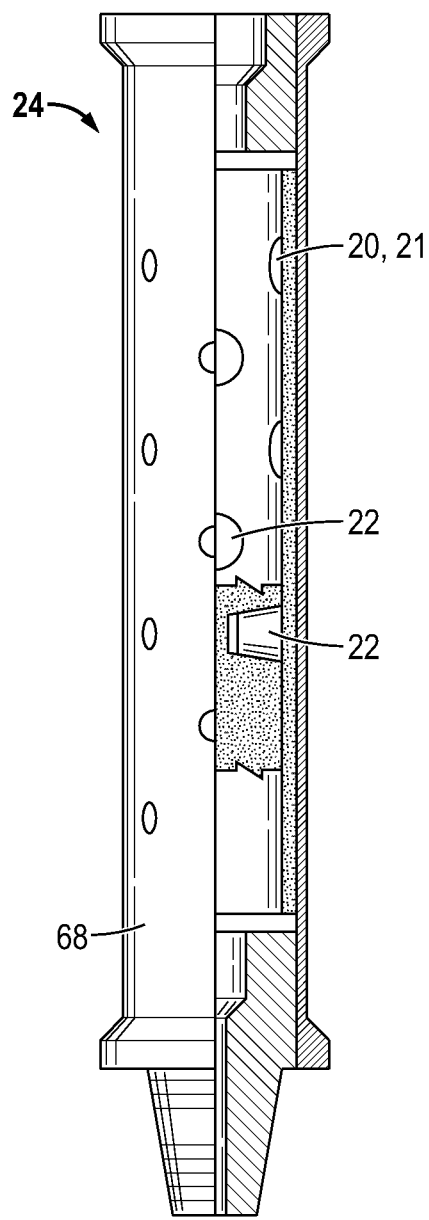
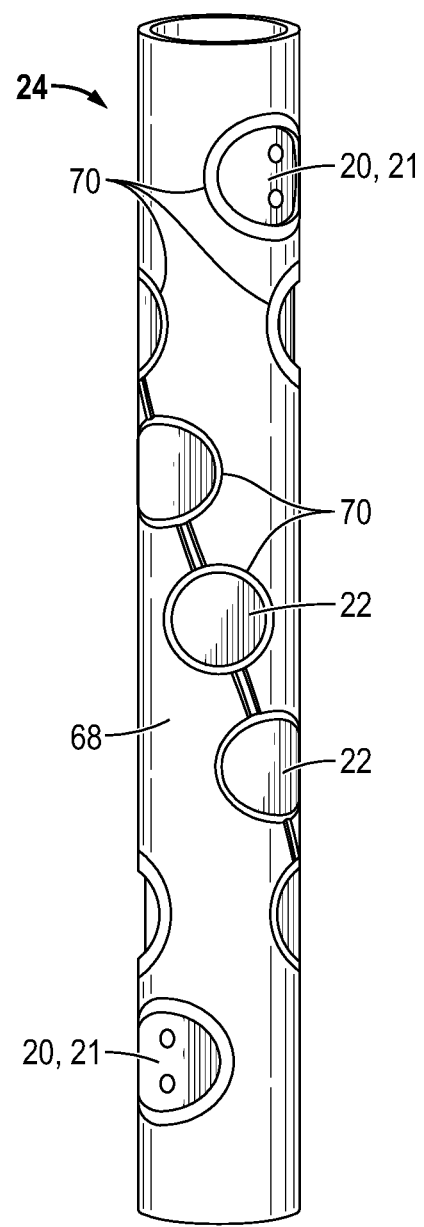

METHOD AND APPARATUS FOR DETERMINING FLUID FLOW CHARACTERISTICS

CROSS-REFERENCE TO RELATED APPLICATIONS

The present application is related to, and claims priority to, European Procedure Patent Application 13305647.3, titled "Measuring Transient Inflow Profile During and After Perforation," filed May 17, 2013, which is incorporated herein in its entirety and for all purposes.

BACKGROUND

This section provides background information to facilitate a better understanding of the various aspects of the disclosure. It should be understood that the statements in this section of this document are to be read in this light, and not as admissions of prior art.

A wellbore may be drilled through a subterranean formation to extract hydrocarbons. Downhole tools may be disposed in the wellbore to perform operations such as, for example, perforating, well stimulation, and production logging. Production logging may be performed for example to measure hydrocarbon production rates or injection rates in the wellbore as a function of depth. Production logging commonly uses spinner type flow meters.

SUMMARY

Examples of a measuring device include a thermal insulating body having an exterior surface to be disposed in use such that a fluid flows across the exterior surface and a recessed thermal conductivity detector (TCD) having a sensor face of a thermally conductive pane recessed below an opening in the exterior surface providing a cavity between the sensor face and the exterior surface. The recessed TCD may measure a thermal characteristic of the flowing fluid. In accordance to some aspects of the disclosure, a downhole tool includes a perforating gun having a plurality of shaped explosive charges and a measuring device arranged in a shaped charge package and mounted in the perforating gun, the measuring device including a pair of thermal conductivity detectors (TCD) spaced laterally apart in a thermal insulating body, each TCD of the pair of TCDs having a thermally conductive pane having a sensor face located substantially co-planar with an exterior surface of the thermal insulating material. An example of a method includes disposing a downhole tool in a wellbore, detonating shaped charges in the tool to perforate the well casing and measuring a velocity of the fluid flowing from the perforations across the downhole tool toward the surface using a measuring device arranged in shaped charge package.

The foregoing has outlined some of the features and technical advantages in order that the detailed description of the methods and devices for determining fluid flow characteristics that follows may be better understood. Additional features and advantages of the methods and devices for determining fluid flow characteristics will be described hereinafter which form the subject of the claims of the invention. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 7 illustrates a downhole tool according to one or more aspects of the disclosure.

FIG. 8 illustrates a downhole tool according to one or more aspects of the disclosure.

DETAILED DESCRIPTION

Figure 1:
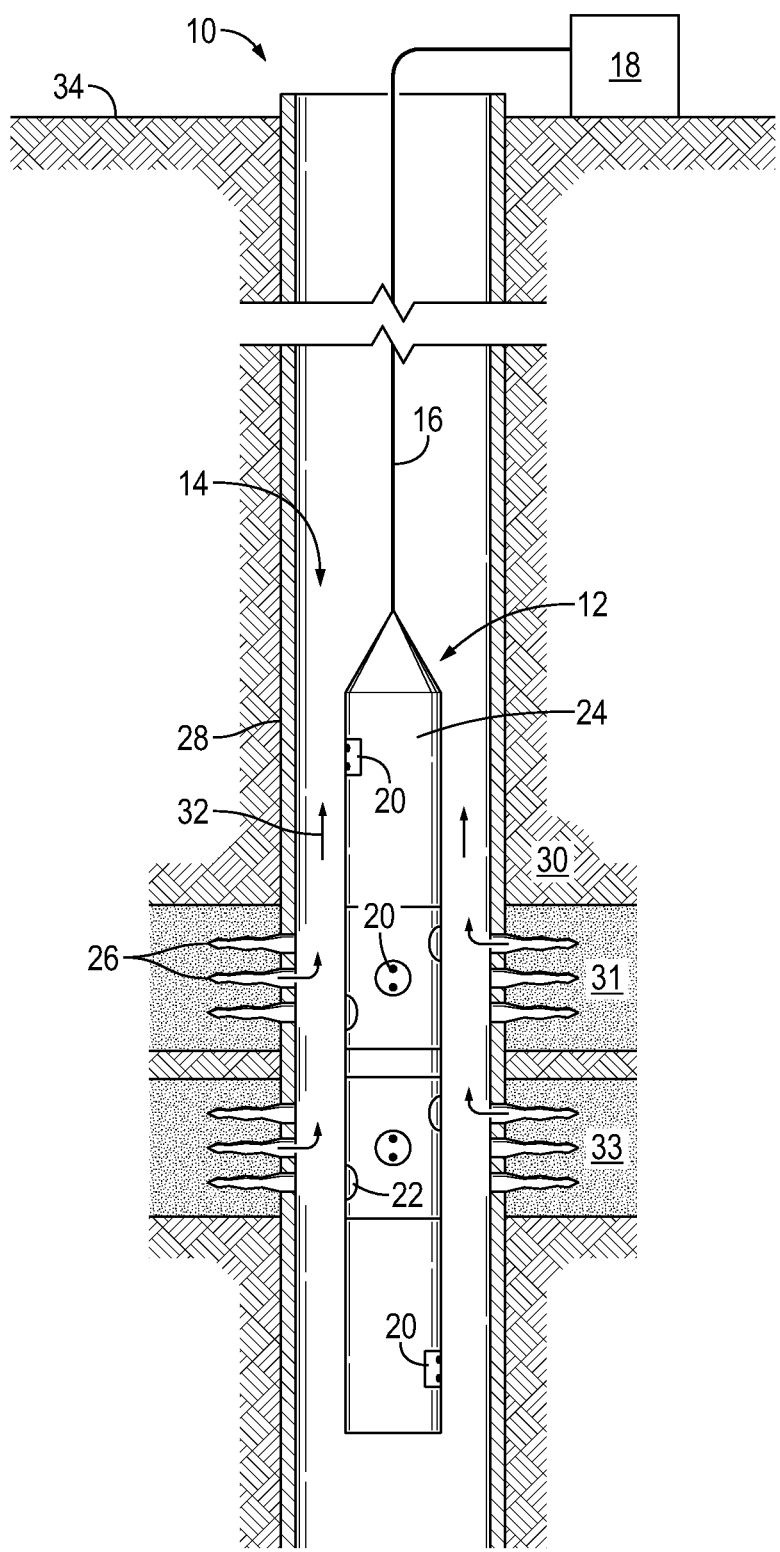
FIG. 1 illustrates an example system in which embodiments of methods and apparatus for determining fluid flow characteristics can be implemented.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point as the surface from which drilling operations are initiated as being the top point and the total depth being the lowest point, wherein the well (e.g., wellbore, borehole) is vertical, horizontal or slanted relative to the surface.

FIG. 1 is a schematic depiction of a well system 10 with a downhole tool 12 deployed into a well 14 on a conveyance 16. Conveyance 16 may be any suitable mechanism of conveyance, for example wireline, slickline, digital slickline (DSL), and tubing (e.g. coiled tubing). Downhole tool 12 may be in communication with a surface controller 18 through conveyance 16, a control line, and wireless telemetry. Well system 10 and downhole tool 12 may include one or more measuring devices, generally denoted by the numeral 20.

Downhole tool 12, e.g. tool string, includes shaped explosive charges 22 arranged in one or more perforating guns 24 to create openings 26, i.e. perforations, through the well casing 28 and into the subterranean formation 30 surrounding the well. The depicted formation 30 includes two or more layers, or zones, specifically identified by the numerals 31, 33. Open detonation of shaped charges 22, reservoir fluid 32 flows from formation 30 (e.g., layers 31, 33) into well 14 and flows upstream to surface 34. Measuring device 20 facilitates measuring reservoir fluid 32 characteristics. For example, measuring device 20 may facilitate, for example and without limitation, measuring the transient inflow profile during and after the perforating operation, fluid flow direction, and fluid flow velocity. "Method for Determining the Inflow Profile of Fluids of Multilayer Deposits," serial no. PCT/RU2012/000872, filed 25 Oct. 2012, and published on 2 May 2013, as number WO2013062446A1, is incorporated herein by reference and describes the utilization of dynamic changes in temperature recorded in various places in a completion string, drill stem testing (DST) or tubing conveyed perforating (TCP) string. It provides a methodology to determine the flow rates of oil, gas and water at several places in the string by using changes of flowing conditions, such as change of choke settings, opening or closure of the well, allowing another zone to produce above or below a set of sensors. This methodology uses intrinsic thermal properties of oil, gas and water. Examples of physical phenomenon controlling changes of temperature of the fluids are Joule Thomson and Adiabatic effects. Other phenomena can also be observed and used for determination of the phased flow rates.

One or more measuring devices 20 may be included in the downhole tool 12. In accordance to one or more embodiments, system 10 includes two or more measuring devices 20 spaced along the length of downhole tool 12. For example, in FIG. 1 a lower most measuring device 20 may be positioned in the well below the producing formation, i.e. below the inflow of fluid 32. Additional measuring devices 20 may be spaced longitudinally along the downhole tool 12 so as to obtain measurements along the flow path of fluid 42. Additionally, the measuring devices 20 may be spaced apart circumferentially about the downhole tool to obtain azimuthal measurements.

Figure 2:
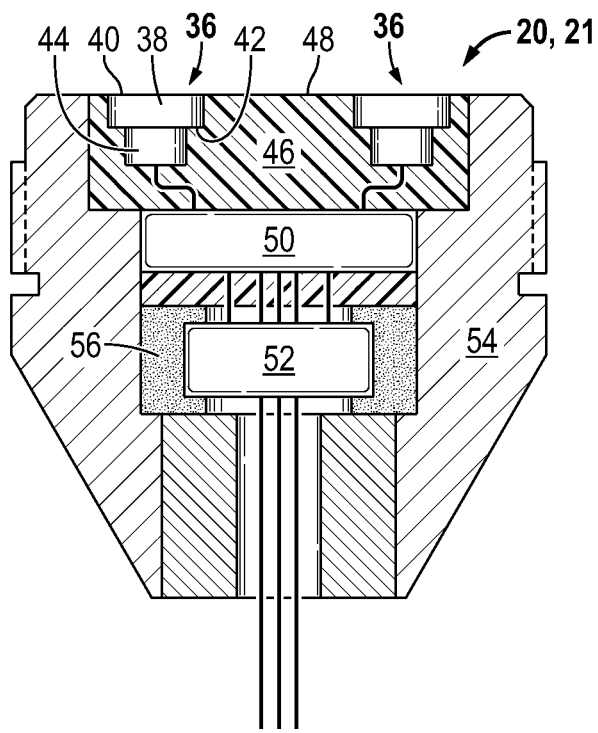
FIG. 2 illustrates a sectional view of a measuring device configured in a shaped charge package according to one or more aspects of the disclosure.
Figure 3:
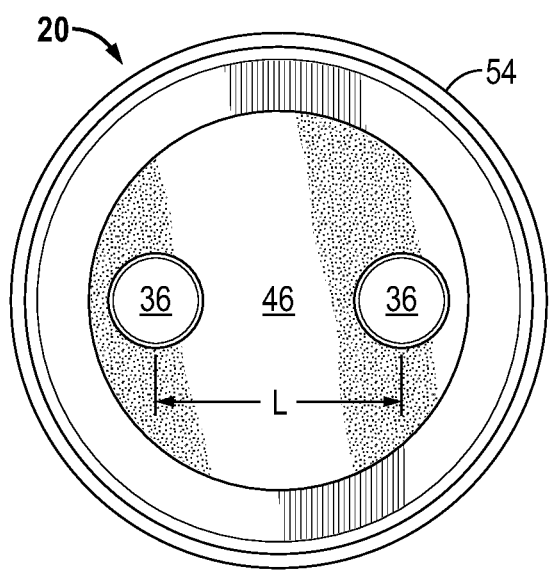
FIG. 3 illustrates an end view of a measuring device according to one or more aspects of the disclosure.

Refer now to FIGS. 2 and 3 which schematically illustrate an example of a measuring device 20 in accordance to one or more embodiments. Measuring device 20 may be used as a temperature sensitive device and/or a thermal device, e.g. heater. Measuring device 20 includes a thermal conductivity detector (TCD) 36, e.g. sensor 36. In the illustrated embodiment, measuring device 20 includes two TCDs 36 spaced laterally apart a distance L, illustrated in FIG. 3. For example, in FIG. 3 the distance L may be about thirty millimeters, however, this dimension is merely an example and other dimensions may be used without departing from the scope of the disclosure. The distance L can be adjusted to target specific fluid velocities within an acquisition rate.

Figure 4:
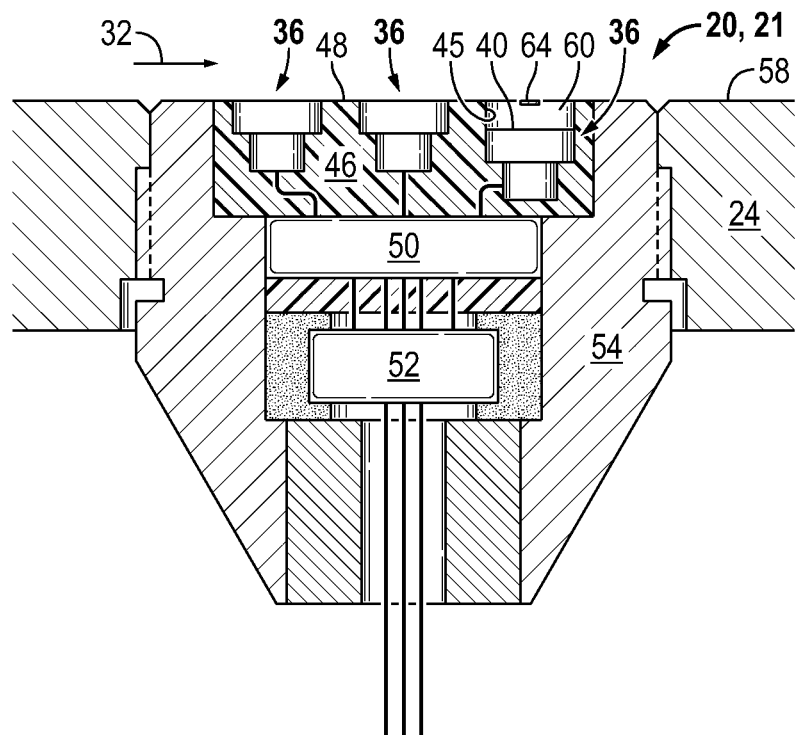
FIG. 4 illustrates a sectional view of a measuring device implemented in a downhole tool according to one or more aspects of the disclosure.

TCD 36 includes a thermally conductive pane 38 having an exterior surface 40, also referred to as sensor face 40, and an interior surface 42. Pane 38 may be constructed of a material such as diamond, aluminum oxide, silicon carbide, etc. In one example, the pane 38 may be constructed of diamond and having a diameter of about four millimeters and a height of about one millimeter. These dimensions are merely examples. A sensing element 44, e.g. electrical resistor, is in direct connection with the interior surface 42 of the pane 38. The sensing element 44 may take several forms, including without limitation an electrical wire brazed to the interior surface and electrically resistive material deposited or coated on the interior surface. For example, the sensing element 44 may be a platinum material. The pane 38 and sensing element 44 are embedded in an insulating body 46 such that the sensing element 44 is thermally insulated. For example, the thermally insulating body 46 may be a material such as, for example, polyether ether ketone (PEEK polymer). In some embodiments, such as illustrated in FIG. 2, the sensor face 40 is substantially co-planar or flush with the exterior surface 48 of the insulating body. In some embodiments, for example as illustrated in FIG. 4, the sensor face 40 may be recessed below the exterior surface 48 of the insulating body so as to form a cavity or chamber between the sensor face and the plane of the exterior surface. TCD 36 is connected to electronics 50 and an electrical power source 52, e.g. battery.

With continued reference to FIGS. 2 and 3, measuring device 20 is configured in a perforating charge package, generally denoted by the numeral 21, so as to be loaded in a perforating gun for deployment in well, for example as illustrated in FIG. 1. The acceleration during perforation operations may reach large values for example on the order of 100,000 meters per second-squared, therefore the measuring device 20 may be held with shock absorbing materials. For example, measuring device 20 is disposed in a housing 54, for example a steel housing. In the depicted example, the sensing electronics are disposed in the housing with a shock absorbing material 56, such as a foam or gel.

FIG. 4 is a cross-sectional view of an example measuring device 20 configured in a perforating charge package 21 disposed or connected in a perforating gun 24. The portion of perforating gun 24 illustrated in FIG. 4 may be carrier or a loading tube depending on the configuration of the perforating gun. For example, perforating gun may be a capsule type perforating gun or a carrier type of perforating gun. The exterior surface 48 of thermally insulating body and the measuring device 20 may be substantially co-planar with the exterior surface 58 of the gun such that formation fluid 32 flows across the sensor face of each TCD 36. In the example depicted in FIGS. 4 and 5, measuring device 20 includes three TCDs 36. The first two measuring devices are illustrated as spaced apart a distance L, for example 15 millimeters.

Figure 5:
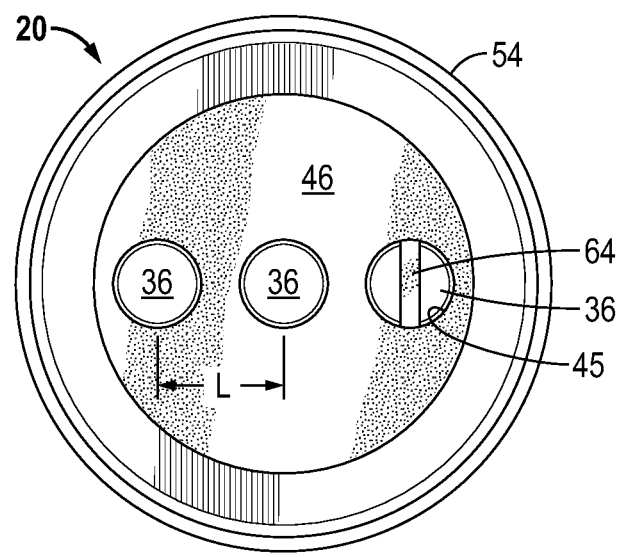
FIG. 5 illustrates an end view of a measuring device having a thermal conductivity detector recessed below an exterior surface of a measuring device according to one or more aspects of the disclosure.
Figure 6:
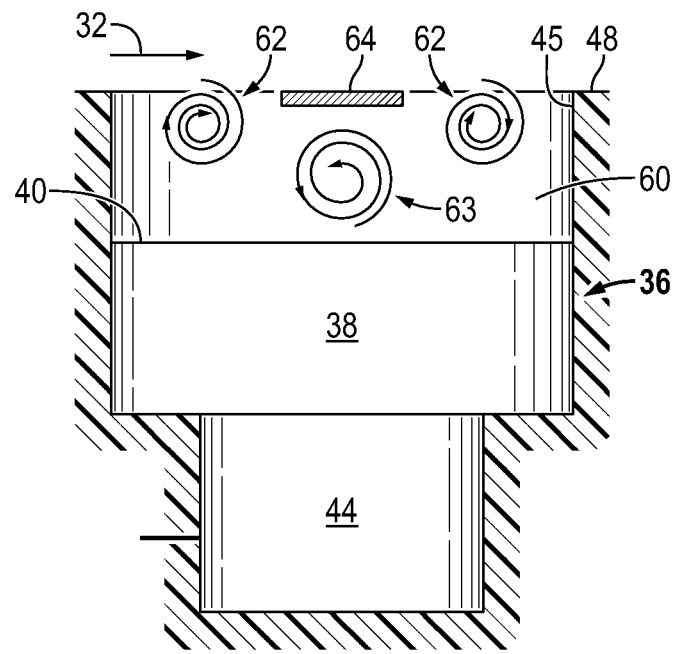
FIG. 6 illustrates a thermal conductivity detector according to one or more aspects of the disclosure.

With reference to FIGS. 4, 5, and 6, the illustrated measuring device 20 includes a TCD 36 that is recessed into insulating body 46 below an opening 45 in the exterior surface 48 to form a cavity 60, or chamber, between sensor face 40 and exterior surface 48 of the measuring device 20. This separates a cavity flow, illustrated by vortices 62, 63 (FIG. 6), from the main portion of formation fluid flow 32. To limit recirculation of the flow a small strut 64 may be placed across opening 45, thereby partially covering opening 45. Vortex 63 is a second order recirculation vortex and its exchange with the main fluid flow 32 is limited and convection onto the TCD 36 will be reduced.

FIG. 7 illustrates an example of a perforating gun 24 in which measuring devices 20 in in the form of a shaped charge package 21 may be implemented. Perforating gun 24 is illustrated as a hollow carrier gun. Shaped explosive charges 22 are connected with an internal member 66, referred to herein as a loading tube 66 and disposed inside of a hollow carrier 68. Carrier 68 may be sealed protecting the internal elements, e.g. charges 22 and measuring device 20, until explosive charges 22 are detonated. Shaped charges 22 may be arranged around the perforating gun in a phased pattern (e.g., spiral, tri-phased, and so forth), similarly measure device(s) 20 may be located at phased positions to obtain azimuthal measurements if desired. A non-phased arrangement of the shaped charges 22 may be used.

FIG. 8 illustrates an example of a perforating gun 24 in which a tubular carrier 68 carries capsule-type shaped charges 22. For example, tubular carrier 68 may have openings 70 in which the shaped charges 22 and measuring devices 20 are disposed and held. In this example, measuring devices 20 are configured in a perforating charge package 21.

Figure 9:
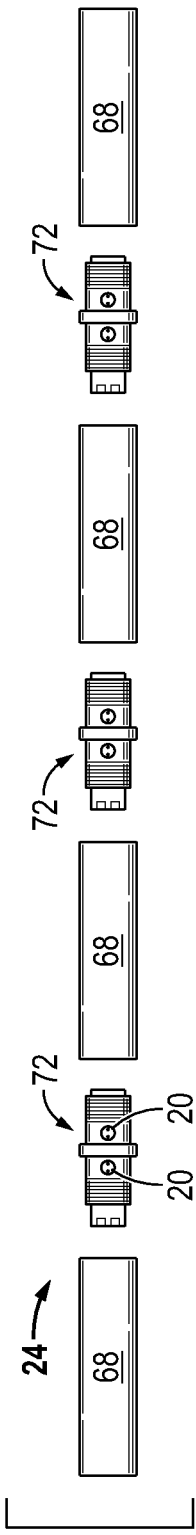
FIG. 9 illustrates a downhole tool according to one or more aspects of the disclosure.

FIG. 9 illustrates an example of a perforating gun 24 in which measuring devices 20 may be implemented. Perforating gun 24 may include one or more gun sections illustrated by carriers 68. Adjacent carriers 68 may be interconnected with tandem adapters or connectors 72. The connectors 72 may be keyed to align the carriers 68 in known phased positions relative to one another such that the perforating gun can be run into the well and the shaped charges can be fired in a desired direction. For example, it may be desired to perforate one side of the well or to not perforate a particular section of the well. Measuring devices 20 may be located in connectors 72 for example to obtain azimuthal measurements.

Figure 10:
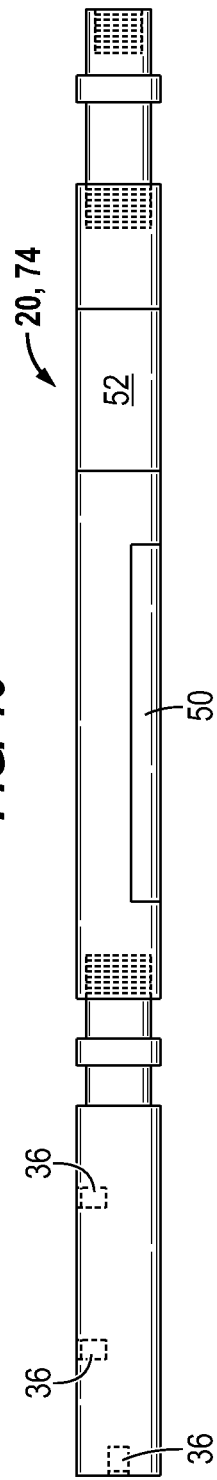
FIG. 10 illustrates a measuring device configured in a slender body package according to one or more aspects of the disclosure.

FIG. 10 illustrates a measuring device 20 configured in a slender body package 74. TDCs 36 are connected via wires through a feed-through to electronics 50 and a power source 52. In the depicted example, two TCDs 36 are spaced apart and face the same direction. In this example a third TCD 36 is oriented 90 degrees from the other two TCDs 36. For example, with reference to FIG. 1, a slender body package 74 as illustrated in FIG. 10 may be connected at the bottom of downhole tool 12 such that measuring device 20 may obtain reference measurements.

Figure 11:
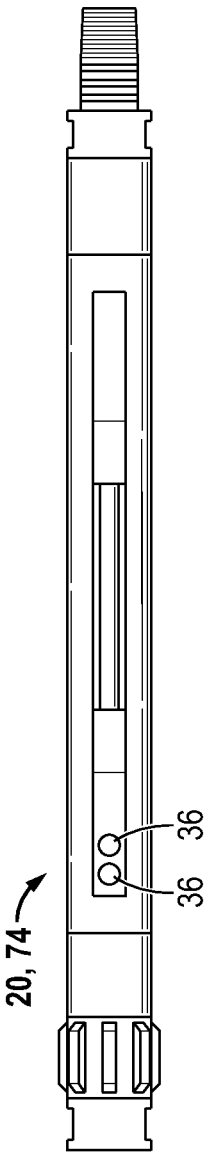
FIG. 11 illustrates a measuring device implemented in a downhole tool according to one or more aspects of the disclosure.

FIG. 11 illustrates an example of a measuring device 20, for example in a slender body package 74, connected with a mandrel 76. Two TCDs 36 are illustrated spaced apart and facing radially outward from the longitudinal axis of mandrel 76. Mandrel 76 may be connected for example in the downhole tool 12 of FIG. 1. For example, mandrel 76 and its measuring device 20 may be positioned within the perforating guns 24 and/or upstream of the perforating guns 24 in the downhole tool 12 in FIG. 1.

Figure 12:
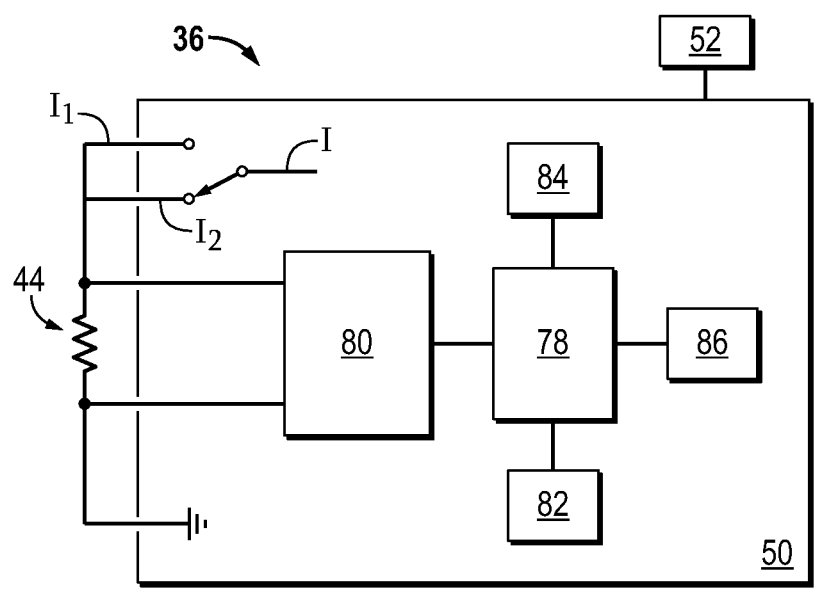
FIG. 12 schematically illustrates an example of circuit architecture according to one or more aspects of the disclosure.

FIG. 12 illustrates an example of an architecture of an electronic circuit, e.g. sensing circuit, associated with a TCD 36. The sensing element 44 is excited using a constant current source I, small enough to avoid self-heating the TCD. The voltage at the TDC terminals may be acquired by a controller 78, e.g. micro-controller, using for example an Analog to Digital Converter (ADC) 80. The controller pilots the various sequences of measurements to get the resistor value of sensing element 44 and then the temperature of the TCD.

The acquisition rate can be of different values to optimize the power, for example provided by a ½ AAA battery 52, and according to a given profile of measurement in the system. A numerical watch-dog can also be proposed to measure at a certain frequency the signal and store in a flash memory 82 only the useful part of the signal. The clock 84 of the system, for example 32.7 kHz, permits high frequency recording if desired. In example circuit, the system works at 2 frequencies, e.g. 1 Hz and 200 Hz. This can be adjusted and adapted to cover different range of fluid flow rates and thermal fluid front tracking. The microcontroller 78 can be synchronized and can communicate through a telemetry system 86. For example, 200 Hz of acquisition corresponds to 5 milliseconds, which allows a detection of a time of flight event at 6 m/s for distance of about 30 mm between the adjacent TCDs 36. More distance or higher frequency rate can be chosen for targeting different ranges of velocities. Calibration coefficients can be recorded in the memory and the acquired raw data can be stored in the memory. Engineering values, calculations, and data treatment can be processed after dumping the memory to the controller.

Measuring device 20 may determine the temperature of the fluid flowing across the sensors in transient conditions. The mode of determination of the phased flow profile may include analyzing the transient variations of the temperature recorded by a set of sensors 36, e.g. a measurement device. Various interpretations methods may be utilized, for example one or more of analyzing the dynamics of the temperature change in multiple locations along the tool string, tracking a front of the temperature gradient passing the sensors (e.g., determining the velocity of the front by time of flight measurement), and analyzing the turbulence velocity, if any, by cross correlation of large turbulent structures passing proximate to the sensors.

The measuring device, or TCD sensor, may determine the velocity of the adjacent fluid 32 by keeping the TCD 36 temperature constant and evaluating the amount of energy advected by the fluid 32 flow. In some embodiments, a TCD 36 (e.g., thermal sensor) can be used when the fluid flow is quasi-still in order to measure the thermal characteristics (e.g., thermal conduction, thermal capacity) of the fluid. In some embodiments, a cavity 60 may be created inside which the fluid is almost still to perform this analysis.

It will be appreciated by those skilled in the art with benefit of this disclosure that various measurements can be performed with a similar packaging, for example, transient pressure measurement in a frequency range adapted to perforation events from static pressure to several kilohertz. In a similar way, acoustic pressure measurements can be achieved before and after perforating to record higher frequency events such as pressure peaks, jet occurrence and sudden turbulence bursts, typically in the range of 10 kHz to 100 kHz and above. Dielectric measurements can be achieved in order to assess which fluid (e.g., oil, gas, or water) is passing in front of the measuring device. Transient viscosity measurements can be performed to provide information about the changes of fluids and relevant parameters for reservoir pressure analysis and production optimization. Several measurements can be performed simultaneously to offer the possibility of knowing each fluid phase, cross interpret for velocity, and the turbulence level nature of the fluid.

In some embodiments, the deployment of the set of measurement devices at one given level in the string allows for a determination of flow profiles at that particular level. A reference measurement below the lowest point of fluid entry in the well can provide additional accuracy in the determination of the phased rates. At each level, one or more measuring device 20 can be used. It may be desired to determine the azimuthal contribution of flow profiles, as created by eccentralization or so called oriented or phased perforations. In high deviation wells it is also possible to deploy several measuring devices to provide the azimuthal information and detect and quantify the eventual segregation of the phases of the flow.

With a constant ambient temperature, a temperature can be generated on TCD 36 using the Joule Law, by applying a significant constant current $I_2$ on the TCD, and monitoring the voltage at its terminals (FIG. 8). The balance between the heating effect and the temperature dissipation to the fluid will be detected when the voltage at the TCD terminals stays constant.

$$\frac{dV_{TCD}}{dt} = 0$$

By switching the TCD supply current from $I_2$ to $I_1$, it is possible to monitor the TCD resistor decay from the plateau value to the ambient temperature value.

Another solution is to apply a constant voltage on the TCD terminals, to measure the current using ADC 80 and detect when the current flowing inside the terminal stays constant, showing the thermal balance.

The TCD 36 sensor as defined above can measure the temperature variations due to various causes in the fluid surrounding the sensor.

One Phase Flow Measurement—Large Velocity:

For large Reynolds Numbers Re=ρVL/μ greater than 1,000 for instance (V order of magnitude of the fluid velocity, L the characteristic annular space of a tool assembly holding the sensor, ρ the fluid density, μ the dynamic viscosity), turbulence bursts may occur, large eddy structures are advected in the flow, resulting in vortices creating local velocity changes that can be detected by the TCD thermal sensors since the temperature field can follow the fluid flow variations. This is known as turbulence correlation. If the signal is recorded simultaneously on the two TCDs 36 of a measuring device 20, this signal becomes fluctuant with a complex distribution of energy in the frequency spectrum but applying the correlation function in time between the two TCDs a series of peaks can be visible (in the time domain), which reflect the velocity of the structures carrying the instabilities. It is known in turbulence theory that these structures are advected at a lower fluid velocity (for instance 80% of this velocity), this may require some post correction in the signal processing.

One Phase Flow Measurement Medium and Large Range Velocity

If one of TCDs 36 is maintained at constant temperature, the amount of energy advected by the flow is described by the thermal equation and results in the King's Law (the amount of energy is used to heat the sensing element is a non-linear function of the flow velocity)

$$R_s I^2 = (T_S - T_f)(A + BV^n) \qquad [1]$$

The current I and the fluid temperature $T_f$ (measured by the other sensor) are stored in the memory, the fluid velocity is known if A, B and n are estimated (knowing the fluid, water, oil, gas). In the case of turbulent measurements the King's Law is still applicable with some averaging and staking to eliminate instable fluctuations.

One Phase Flow Measurement (Laminar flow Re=ρVL/μ<<1000)

At lower velocities the fluid is more or less laminar and the flow profile becomes locally parabolic or stable. An elegant way to measure the low flow velocities (with a small Reynolds number) is to use the time of flight correlation between the upstream TCD 36 and the downstream TCD 36 of a measuring device 20.

A thermal signal, for example a ½ sinusoidal wave, is applied at the upstream TCD 36, the fluid is locally heated and moves in front of the second TCD 36 where the temperature jump can be recorded.

Two Phase Flow Measurement: Front Tracking

If two fluids are separated by an interface their conduction characteristics differ and have different temperatures. The passage of the interface in front of the two sensors, i.e. TDCs, will be seen substantially the same way as for the time of flight measurement, without the need of heating the upstream TCD.

The determination of the phased flow rates can also be performed following the methodology described for example in WO2013062446 mentioned above and incorporated herein by reference. The interpretation of the transient response of the temperature to a change of pressure or total flow rate or flow path can provide the information.

Thermal Characteristics of the Fluid

When the TCD is in contact with a fluid at rest, or at very low flow rates, at temperature $T_0$, a thermal jump $T_h - T_0$ of TCD will result in heating the fluid 32 with a time history that will reflect its thermal characteristics. For example, a fluid at rest may be located below the point of inflow.

According to one method, any one of the TCDs 36 of a measuring device 20 is utilize for the thermal characteristic evaluation when the flow is still. In some embodiments, for example as illustrated in FIGS. 4 and 5, a TCD 36 is recessed or disposed in a small chamber which will separate the cavity flow from the main flow. This separates a cavity flow, illustrated by vortices 62, 63, from the main portion of formation fluid flow 32. To limit recirculation of the flow a small strut 64 may be placed across the opening into the cavity 60. Vortex 63 is a second order recirculation vortex and its exchange with the main fluid flow 32 is limited and convection onto the TCD 36 will be reduced.

When a TCD 36 is heated by a current I passing through the TCD resistor $R_{TCD}$ (sensing element 44) the power provided to the resistor is $R_{TCD}I^2$ (in watts). The TCD 36 in contact with the fluid 32 will lose its energy the temperature $T_h - T_0$ reaching a limit depending on the calorific capacity of the pane 38 and the heat flux at the interface of the sensor face 40 and fluid 32, assuming that the insulator 46 does not pump heat in the system in a first approximation.

$$\rho C_{Dia}(T_h - T_0) \mho_{TCD} = R_{TCD} I^2 \qquad [2]$$
$$= \iint_S -k_{fluid} \frac{\partial T}{\partial r}\bigg|_{r=d+} ds$$
$$= -k_{fluid} \pi d^2 \frac{\partial T}{\partial r}\bigg|_{r=d+}$$

$\mho_{TCD}$ is the volume of pane 38, e.g. diamond layer. The current I is a controlled data by electronics 50. Therefore, I and $\Delta_h t$ are input data.

The cooling of the TCD 36 is assumed to occur through the sensor face 40 in contact with the fluid 32. The flux passing through this interface reflects the loss of heat in the fluid $$k_{dia} \frac{\partial T}{\partial r}\bigg|_{r=d-} = -k_{fluid} \frac{\partial T}{\partial r}\bigg|_{r=d+} \qquad [3]$$

Since $$\frac{k_{fluid}}{k_{dia}} \ll 1,$$

equation 3 indicates that the temperature is constant inside the TCD system, i.e. pane 38.

Estimation of $k_{fluid}$

When the thermodynamic system is in equilibrium, the heat equation does not depend on time and $(T_h-T_0)$ is constant.

For the sake of simplification, consider the TCD sensor as a small sphere of diameter 2d with an interface (of surface $2\pi d^2$) with the fluid at r=d, the energy equation is written (incompressible fluid)

$$\left(\frac{\partial^2 T}{\partial r^2} + \frac{2}{r}\frac{\partial T}{\partial r}\right) = 0 \Leftrightarrow \frac{\partial^2 rT}{\partial r^2} = 0 \quad [4]$$

With the boundary condition $$T(d) = T_h, T(\infty) = T_0 \quad [5]$$

$$\left(\frac{\partial^2 T}{\partial r^2} + \frac{2}{r}\frac{\partial T}{\partial r}\right) = 0 \Leftrightarrow T = T_0 + \frac{d(T_h - T_0)}{r}, \quad [6]$$

Using equations 2 and 3:

$$R_{TCD} I^2 = -k_{fluid} 2\pi d^2 \frac{\partial T}{\partial r}\bigg|_{r=d+} = k_{fluid} 2\pi d(T_h - T_0) \quad [7]$$

Knowing $R_{TCD}$ $(T_h-T_0)$ is known then $$k_{fluid} = \frac{R_{TCD} I^2}{2\pi d(T_h - T_0)} \quad [8]$$

Estimation of $\rho C_{fluid}$

After the system has reached thermal equilibrium, by switching off the current the TCD will cool down up to the moment the fluid temperature $T_0$ is reached. The heat equation is now time dependent.

The heat equation is written inside the thermally conductive layer, i.e. pane 38:

$$\rho_{dia} C_{dia} \frac{\partial T}{\partial t} - k_{dia}\left(\frac{\partial^2 T}{\partial r^2} + \frac{2}{r}\frac{\partial T}{\partial r}\right) = 0 \quad [9]$$

And in the fluid:

$$\rho_{fluid} C_{fluid} \frac{\partial T}{\partial t} - k_{fluid}\left(\frac{\partial^2 T}{\partial r^2} + \frac{2}{r}\frac{\partial T}{\partial r}\right) = 0 \quad [10]$$

With the flux condition $$k_{dia} \frac{\partial T}{\partial r}\bigg|_{r=d-} = -k_{fluid} \frac{\partial T}{\partial r}\bigg|_{r=d+} \quad [11]$$

And the initial condition $$T_{dia} = T_h, t \text{ and } r \to \infty, T_{dia} = T_0 \quad [12]$$

Inside TCD, equation 3 shows that the temperature is nearly constant everywhere inside the TCD.

This condition expresses the loss in temperature of the TCD in the fluid at the interface r=d, and represents the driving condition for the temperature diffusion in the fluid. It can be measured at each moment, with $$r = d\chi, \tau = \frac{k_{fluid}}{\rho C_{fluid} d^2} t = \overline{D} t, \quad [13]$$

$$\Theta = \frac{T - T_0}{T_h - T_0},$$

Considering the function $\chi\Theta$ instead of $\Theta$ the energy equation becomes:

$$\frac{\partial \chi\Theta}{\partial \tau} = \frac{\partial^2 \chi\Theta}{\partial \chi\Theta} \quad [14]$$

Note that $(T_h-T_0)$ (t) can be measured directly by the TCD as its time evolution, therefore the value of $k_{fluid}$ can be known by solving the problem of temperature diffusion.

A solution of this equation is $$\theta(\chi, \tau) = A \frac{\sin k\chi}{\chi} e^{-\alpha^2 \tau} \quad [15]$$

$\alpha^2$ is a positive constant of integration, thus the TCD temperature is then $$\theta(1,\tau) = A \sin k e^{-\alpha^2 \tau} \quad [16]$$

At =0, $\theta(1, \tau)=1 \to A \sin k=1$ $$\frac{\partial \Theta}{\partial \tau}(1, \tau) = -\alpha^2 e^{-\alpha^2 \tau} \quad [17]$$

Therefore, in a dimensional frame:

$$\frac{\partial T}{\partial t}\bigg|_{t=0}$$

can be measured directly, all parameters in equation 16 being known or measured:

$$k = \sqrt{\left\|\frac{1}{(T_h - T_0)} \frac{\rho C_{dia} d^2}{2\pi k_{fluid}} \frac{\partial T}{\partial t}\bigg|_{t=0}\right\|} \quad [18]$$

The measured time t* for which the temperature is divided by 2, for example, is $$\theta(\chi, \tau^*) = 0.5 \qquad [19]$$
$$= e^{-k^2\tau^*} \Rightarrow \log 0.5$$
$$= -k^2\tau^*$$
$$= \frac{k_{fluid}}{\rho C_{fluid} d^2} t^*$$

Leading to:

$$\rho_{fluid} C_{fluid} = -k^2 \frac{k_{fluid}}{\log 0.5 d^2} t^* \qquad [20]$$
$$= -\frac{t^*}{2\pi \log 0.5} \frac{\rho_{dia} C_{dia}}{(T_h - T_0)} \frac{\partial T}{\partial t}\bigg|_{t=0}$$

Thus the characteristics of the fluid 32 are determined from the temperature level reached for a given power supply and the time the temperature decreases by half when the power is switched off.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A measuring device, the device comprising:
   a thermal insulating body having an exterior surface;
   a thermal conductivity detector (TCD) recessed into the exterior surface of the thermal insulating body, comprising:
      a thermally conductive pane sealed within an opening of the thermal insulating body such that no space exists between a circumference of the thermally conductive pane and the thermal insulating body, and oriented parallel to the exterior surface, said thermally conductive pane having a sensor face recessed below the exterior surface providing a cavity between the sensor face and the exterior surface, and
      a single-component sensing element that converts electricity to heat and senses temperature, the single-component sensing element directly contacting the thermally conductive pane and embedded in and directly contacting the thermal insulating body.

2. The device of claim 1, further comprising a strut partially covering the opening.

3. The device of claim 1, wherein the sensing element is in direct connection with an interior surface of the pane opposite from the sensor face, the sensing element in connection with a sensing circuit.

4. The device of claim 3, wherein the TCD is configured to measure thermal characteristics at the exterior surface.

5. The device of claim 1, wherein:
   the sensing element is in direct connection with an interior surface of the pane opposite from the sensor face, the sensing element in connection with a sensing circuit;
   the thermal insulating body is mounted in a housing; and
   the sensing circuit is disposed in the housing with a shock absorbing material.

6. The device of claim 5, wherein the housing is loaded in a perforating gun.

7. The device of claim 1, further comprising a pair of spaced apart TCDs mounted in the thermal insulating body, wherein each TCD of the pair of TCDs comprises a sensor face positioned substantially co-planar with the exterior surface.

8. The device of claim 7, wherein the pair of spaced apart TCDs and the recessed TCD are mounted in a housing which is loaded into a perforating gun.

9. The device of claim 7, wherein:
   the pair of TCDs each comprise a sensing element, the sensing element of the pair of TCDs and the sensing element of the recessed TCD are in connection with a sensing circuit;
   the thermal insulating body is mounted in a housing; and
   the sensing circuit is disposed in the housing with a shock absorbing material.

10. The device of claim 9, wherein the housing is loaded in a perforating gun.

11. A downhole tool, comprising:
   a perforating gun comprising a plurality of shaped explosive charges; and
   a measuring device configured in a shaped charge package and mounted in the perforating gun, the measuring device comprising:
      a thermally conductive pane having a sensor face recessed and sealed within an opening in an exterior surface of a thermal insulating body, the sensor face being oriented parallel to the exterior surface of the thermal insulating body and providing a cavity between the sensor face and the exterior surface of the thermal insulating body such that no space exists between a circumference of the thermally conductive pane and the thermal insulating body, wherein the thermal insulating body directly contacts the measuring device to insulate the measuring device, and
      a sensing element embedded in the thermal insulating body and in direct connection with an interior surface of the pane opposite from the sensor face, the sensing element in connection with a sensing circuit configured to measure a thermal characteristic of the fluid flowing across the exterior surface of the tool.

12. The downhole tool of claim 11, comprising a reference measuring device located below the perforating gun.

13. The downhole tool of claim 11, wherein the sensing circuit is configured to determine a velocity of a fluid flowing across the perforating gun and the measurement device.

14. The downhole tool of claim 13, wherein the thermal insulating body is mounted in a housing; and the sensing circuit is disposed in the housing with a shock absorbing material.

15. The downhole tool of claim 11, further comprising a thermal conductivity detector (TCD), the TCD comprising:
   a pair of thermal conductivity detectors (TCD) spaced laterally apart in the thermal insulating body, each TCD of the pair of TCDs having a thermally conductive pane having a sensor face located substantially co-planar with the exterior surface of the thermal insulating material, and a sensing element in connection with an interior surface of the pane.

16. The downhole tool of claim 15, further comprising a strut partially covering the opening.

17. A method, comprising:
disposing a downhole tool in a well, the downhole tool comprising a perforating gun comprising a plurality of shaped explosive charges and a measuring device configured in a shaped charge package and mounted in the perforating gun, the measuring device including a pair of recessed thermal conductivity detectors (TCD) spaced laterally apart and recessed and sealed within in a thermal insulating body such that no space exists between a circumference of the TCD and the thermal insulating body, wherein the thermal insulating body directly contacts the TCD to insulate the TCD, and the TCD including a thermal conductive pane having a sensor face recessed and sealed below an opening in an exterior surface of the thermal insulating body providing a cavity between the sensor face and the exterior surface, the TCD also including a sensor embedded in the thermal insulating body;
detonating the shaped explosive charges, thereby creating fluid communication with a subterranean formation through perforations; and
measuring a velocity of the fluid flowing in a direction from the perforations to a surface of the well utilizing the pair of TCDs.

18. The method of claim 17, further comprising determining a thermal characteristic of the fluid flowing across the downhole tool utilizing the pair of recessed thermal conductivity detector (TCDs) located on the downhole tool.

19. The method of claim 17, wherein fluid inside the cavity is in contact with the sensor face; and determining a thermal characteristic of the fluid flowing across the TCD.

* * * * *